(12) United States Patent
Ajioka

(10) Patent No.: US 10,649,699 B2
(45) Date of Patent: May 12, 2020

(54) SETTING CONTROL PROGRAM AND SETTING CONTROL METHOD

(71) Applicant: KONICA MINOLTA, INC., Chiyoda-ku, Tokyo (JP)

(72) Inventor: Takashi Ajioka, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/243,689

(22) Filed: Jan. 9, 2019

(65) Prior Publication Data
US 2019/0243585 A1    Aug. 8, 2019

(30) Foreign Application Priority Data

Feb. 2, 2018    (JP) .................. 2018-017029

(51) Int. Cl.
| | |
|---|---|
| *G06F 15/00* | (2006.01) |
| *G06K 15/00* | (2006.01) |
| *G06K 1/00* | (2006.01) |
| *G06F 3/12* | (2006.01) |
| *G06N 3/02* | (2006.01) |

(52) U.S. Cl.
CPC ............ *G06F 3/1204* (2013.01); *G06F 3/121* (2013.01); *G06F 3/1205* (2013.01); *G06F 3/1234* (2013.01); *G06F 3/1257* (2013.01); *G06F 3/1273* (2013.01); *G06F 3/1285* (2013.01); *G06N 3/02* (2013.01)

(58) Field of Classification Search
CPC ...... G06F 3/1204; G06F 3/121; G06F 3/1234; G06F 3/1273; G06F 3/1285; G06N 3/02
USPC .............................. 358/1.14, 1.15, 1.13, 1.1
See application file for complete search history.

(56) References Cited

U.S. PATENT DOCUMENTS

| | | | | |
|---|---|---|---|---|
| 2008/0239373 | A1* | 10/2008 | Suzuki .................. | G06F 3/1208 358/1.15 |
| 2015/0169334 | A1* | 6/2015 | Iijima ................... | G06F 9/4411 713/100 |

FOREIGN PATENT DOCUMENTS

JP    2011060003 A    3/2011

* cited by examiner

*Primary Examiner* — Douglas Q Tran
(74) *Attorney, Agent, or Firm* — Holtz, Holtz & Volek PC

(57) ABSTRACT

A non-transitory recording medium storing a computer readable setting control program operating on an apparatus that corrects a print job, causes the apparatus to perform: by reading previously-registered setting information of the print job, displaying a setting value of each of items in a correctable manner; saving, in a storage, when a setting value of any one of the items is corrected, an uncorrected setting value of the item; and by classifying the items of the print job into a first item a setting value of which has not been corrected and a second item a setting value of which has been corrected, registering, in a database in a distinguishable manner, a set of the first item and the setting value of the first item and a set of the second item and an uncorrected setting value of the second item.

14 Claims, 8 Drawing Sheets

| Field | Value |
|---|---|
| PRODUCT NAME: | |
| PRODUCT CLASS | |
| CLIENT NAME: | |
| CLIENT CODE: | |
| SALES REPRESENTATIVE: | |
| SALES REPRESENTATIVE CODE: | |
| SALES REPRESENTATIVE CONTACT INFORMATION: | |
| OUTPUT DESTINATION: | ⊙ MIS   ○ AccurioPro |
| PAGE SIZE | A4 |
| NUMBER OF PAGES: | 182 × 257 |
| COPIES: | 182 |
| BOOKBINDING STYLE: | 10000 |
| BINDING DIRECTION: | SADDLE STITCHING |
| JOB NUMBER: | ⊙ LEFT  ○ RIGHT  ○ NONE |
| PAPER TYPE: | Fine N |
| PAPER SIZE: | A4   182 × 257 |
| PRINTING METHOD: | DEP |
| PRINTING SHEETS: | 10000 |
| NUMBER OF COLORS: | 4+4 |
| PRINTING ORDER OF COLORS: | KCMYKCMY |
| PLANNED PRINTING DATE: | |
| DELIVERY DATE: | 2017/12/31 |
| MODE OF DELIVERY: | |
| DELIVERY SITE: | |
| EDITING METHOD: | DEP |
| PROOF PRINT SHEETS: | 6 |
| COLOR SETTING: | JapanColor Density |

[ OK ]   [ CANCEL ]

FIG. 8

| JOB NAME | | |
|---|---|---|
| PRINTING METHOD | DEP | ▽ |
| PRINT SIZE | A4 | ▽ |
| PAPER SIZE | A4 | ▽ |
| BOOKBINDING METHOD | SADDLE STITCHING | ▽ |
| DELIVERY DATE | 2017/12/31 | ☐ |
| ... | | |

FIG. 9

| JOB NAME | | | |
|---|---|---|---|
| PRINTING METHOD | DEP | ▽ | (A) |
| PRINT SIZE | A4 | ▽ | (A) |
| PAPER SIZE | A4 | ▽ | (A) |
| BOOKBINDING METHOD | SADDLE STITCHING | ▽ | (A) |
| DELIVERY DATE | 2017/12/31 | ☐ | (A) |
| ... | | | |

FIG. 10

| JOB NAME | | | |
|---|---|---|---|
| PRINTING METHOD | DEP | ▽ | (A) |
| PRINT SIZE | A4 | ▽ | (A) |
| PAPER SIZE | A3 | ▽ | (B) |
| BOOKBINDING METHOD | SADDLE STITCHING | ▽ | (A) |
| DELIVERY DATE | 2017/12/31 | ☐ | (A) |
| ... | | | |

FIG. 11

| UNCERTAIN ITEM | | | RELIABLE ITEM | |
|---|---|---|---|---|
| PAPER SIZE | A4 | | PRINTING METHOD | DEP |
| | | | PRINT SIZE | A4 |
| | | | BOOKBINDING METHOD | SADDLE STITCHING |

SETTING CONTROL PROGRAM AND SETTING CONTROL METHOD

The entire disclosure of Japanese patent Application No. 2018-017029, filed on Feb. 2, 2018, is incorporated herein by reference in its entirety.

BACKGROUND

Technological Field

The present invention relates to a setting control program and a setting control method, and in particular to a setting control program and a setting control method for controlling registration of setting information of a print job.

Description of the Related art

When printing processing is performed, each item on a print setting screen is set to generate a print job. In order to facilitate this setting work, a system has been proposed in which setting information of print jobs executed in the past are registered in a database and setting candidates are presented by machine learning with reference to a database.

Here, since setting a print job includes complex constraint conditions depending on combinations, the cost for machine learning rises in order to extract an appropriate setting candidate. In addition, a print job has many items to be set, and also the setting contents are complicated, and thus a mistake is likely to occur upon input. Furthermore, there are cases where it is necessary to consider compatibility of materials that could not be predicted initially. Since in a case where there is a problem in setting, a loss occurs due to an unnecessary product, a countermeasure is put in place by rendering, in advance, combinations of problematic settings called prohibition to software which performs print setting.

Regarding software that performs the above print setting, for example, JP 2011-60003 A discloses a printer driver which operates on basic software when printing is performed in a printer from application software of a computer, the printer driver including: a print condition setting confirmation means for setting and checking print conditions when receiving a print job from the application software; a print condition information storage means for obtaining the content of the print conditions and storing the content as a history; a print data generating means for converting document data accepted for the print job into print data on the basis of the print conditions; a print data information acquiring and storing means for acquiring related information related to printing of the print data and storing the information as a history; a print cancellation means for receiving and accepting a print cancellation and a print cancellation reason; a print cancellation information storing means for acquiring print cancellation information including a print cancellation reason and storing the information as a history when the print cancellation is accepted; an information management means for storing and managing the print condition information, the print data information, and the printing cancellation information in association with each other; a similarity determining means for determining whether contents of the print cancellation reason in the past, the print data information, and the print conditions that are stored and managed by the information management means in association with each other and contents of the print data information and the print conditions of the accepted print job are similar to each other by a preset method of determining similarly; and a print continuation input means for displaying, in the case where it is determined by the similarity determining means that they are similar, whether to continue printing and inputting an instruction.

As described above, the prohibition is determined by the software that performs print setting. However, since there are cases where products of multiple companies are mixed in each process in printing, it is difficult to reliably assume the prohibition in advance. In response to this problem, JP 2011-60003 A discloses a technology to store information of a job whose printing has been canceled to allow for usage in subsequent countermeasures; however, in this method an operator has to explicitly input and register the print cancellation and a reason for the print cancellation after the printing has been actually cancelled, which increases the load of the work and cannot be understood as being practical.

SUMMARY

The present invention has been made in view of the above problems, and a main object of the present invention is to provide a setting control program and a setting control method capable of reducing an operator's input load when a problematic item in a print job is registered to a database.

To achieve the abovementioned object, according to an aspect of the present invention, there is provided a non-transitory recording medium storing a computer readable setting control program operating on an apparatus that corrects a print job, and the setting control program reflecting one aspect of the present invention causes the apparatus to perform: by reading previously-registered setting information of the print job, displaying a setting value of each of items in a correctable manner; saving, in a storage, when a setting value of any one of the items is corrected, an uncorrected setting value of the item; and by classifying the items of the print job into a first item a setting value of which has not been corrected and a second item a setting value of which has been corrected, registering, in a database in a distinguishable manner, a set of the first item and the setting value of the first item and a set of the second item and an uncorrected setting value of the second item.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating an example of a print setting screen displayed on the first processing apparatus according to the embodiment of the present invention;

FIG. 8 is a diagram illustrating an example of a part of items and their setting values of the print setting screen according to the embodiment of the present invention;

FIG. 9 is a diagram illustrating an example of a part of items and their setting values of the print setting screen according to the embodiment of the present invention (example in which operator information of the first processing apparatus is associated);

FIG. 10 is a diagram illustrating an example of a part of items and their setting values of the print setting screen according to the embodiment of the present invention (example in which operator information of the second processing apparatus is associated); and FIG. 11 is a diagram illustrating an example of registration information of a database stored in a storage device according to the embodiment of the present invention.

DETAILED DESCRIPTION OF EMBODIMENTS

Figure 1:
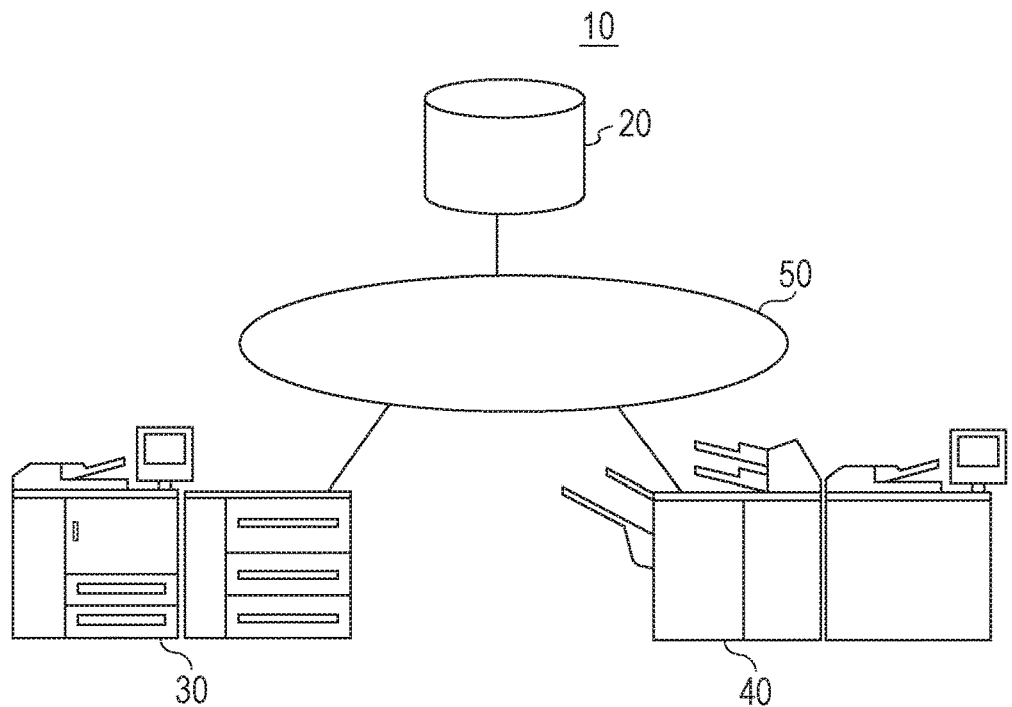
FIG. 1 is a schematic diagram illustrating a configuration of a printing system according to an embodiment of the present invention.

Hereinafter, one or more embodiments of the present invention will be described with reference to the drawings. However, the scope of the invention is not limited to the disclosed embodiments.

As described in the related art, since setting a print job includes complex constraint conditions depending on combinations, the cost for machine learning rises in order to extract an appropriate setting candidate. In addition, a print job has many items to be set, and also the setting contents are complicated, and thus a mistake is likely to occur upon input. Furthermore, there are cases where it is necessary to consider compatibility of materials that could not be predicted initially. Therefore, prohibition is determined by software that performs print setting.

However, since there are cases where products of multiple companies are mixed in each process in printing, it is difficult to reliably assume the prohibition in advance. In response to this problem, a method of storing information of a job whose printing has been canceled to allow for usage in subsequent countermeasures is proposed; however, in this method an operator has to explicitly input and register the print cancellation and a reason for the print cancellation after the printing has been actually cancelled, which increases the load of the work and cannot be understood as being practical.

For example, it does not become clear whether a failure has occurred in printing until the printing is actually completed. Particularly, in the case where a printing process includes a plurality of steps including a pre-process and a post-process, in order to determine the suitability of the contents set in the pre-process, the operator has to wait until processing of the post-process is completed. In addition, in the case where the pre-process and the post-process are performed at different places (for example, the pre-process performed at a printing office and the post-process performed at a work site), an operator of the pre-process has to go to a place where the post-process is performed to confirm the result.

Therefore, in one embodiment of the present invention, a problematic item out of items set in a print job is specified and is automatically registered in a database, thereby reducing the input load of an operator. More specifically, in an apparatus that corrects the print job, previously-registered setting information of the print job is read, and a setting value of each item is displayed in a correctable manner and when a setting value of any item is corrected, an uncorrected setting value of the item is saved in a storage. The items of the print job are classified into a reliable item a setting value of which has not been corrected and an uncertain item a setting value of which has been corrected, and a set of the reliable item and a setting value of the item and a set of the uncertain item and an uncorrected setting value before of the item are distinguishably registered in a database.

As a result, the input load of the operator can be reduced, and the relationship between the reliable item having no problem in the setting value and the uncertain item having a problem in the uncorrected setting value can be automatically learned. In addition, it is possible to call attention for uncertain items at the time of setting and to prevent inappropriate setting in advance.

Embodiment

Figure 2:
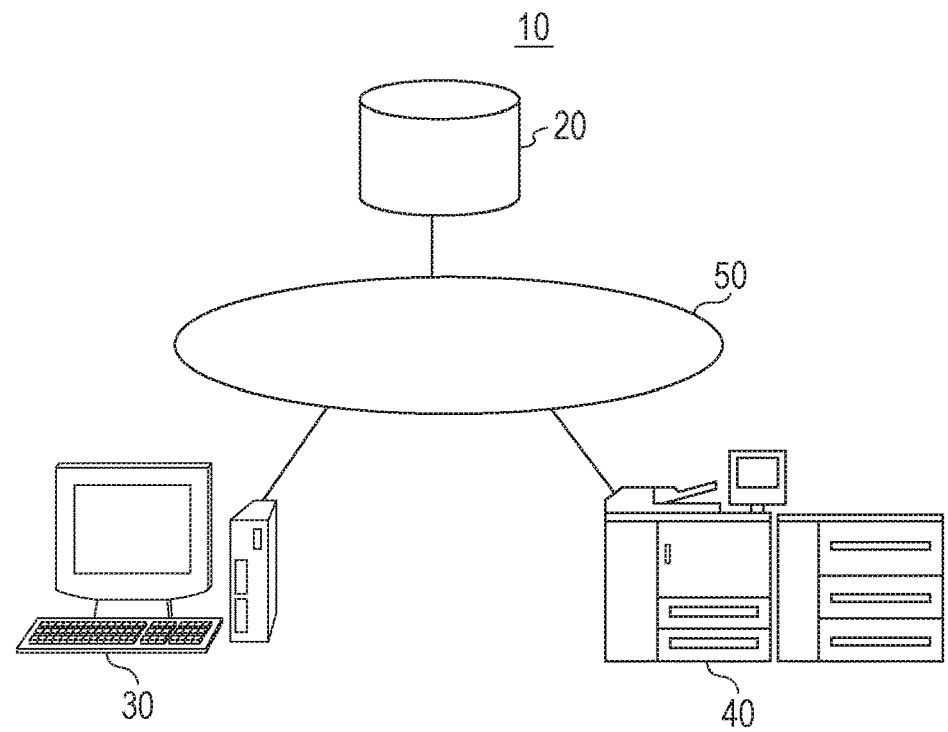
FIG. 2 is a schematic diagram illustrating another configuration of a printing system according to an embodiment of the present invention.
Figure 3A:
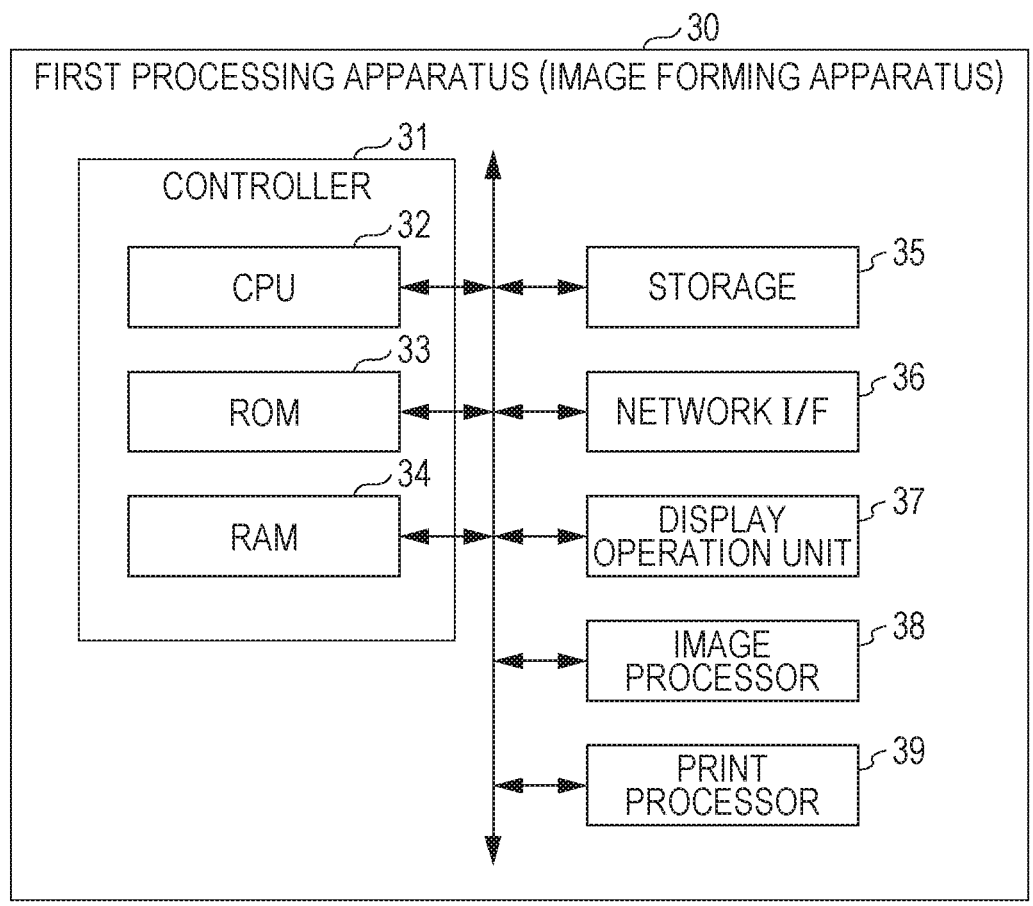
FIGS. 3A and 3B are block diagrams illustrating a configuration of a first processing apparatus according to an embodiment of the present invention.
Figure 3B:
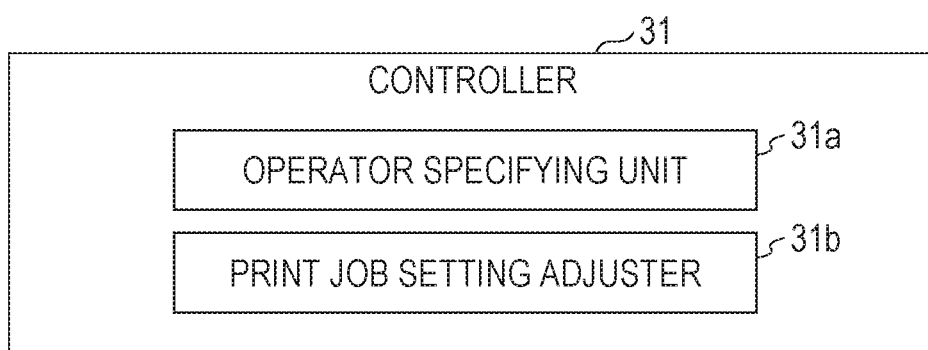
Figure 4A:
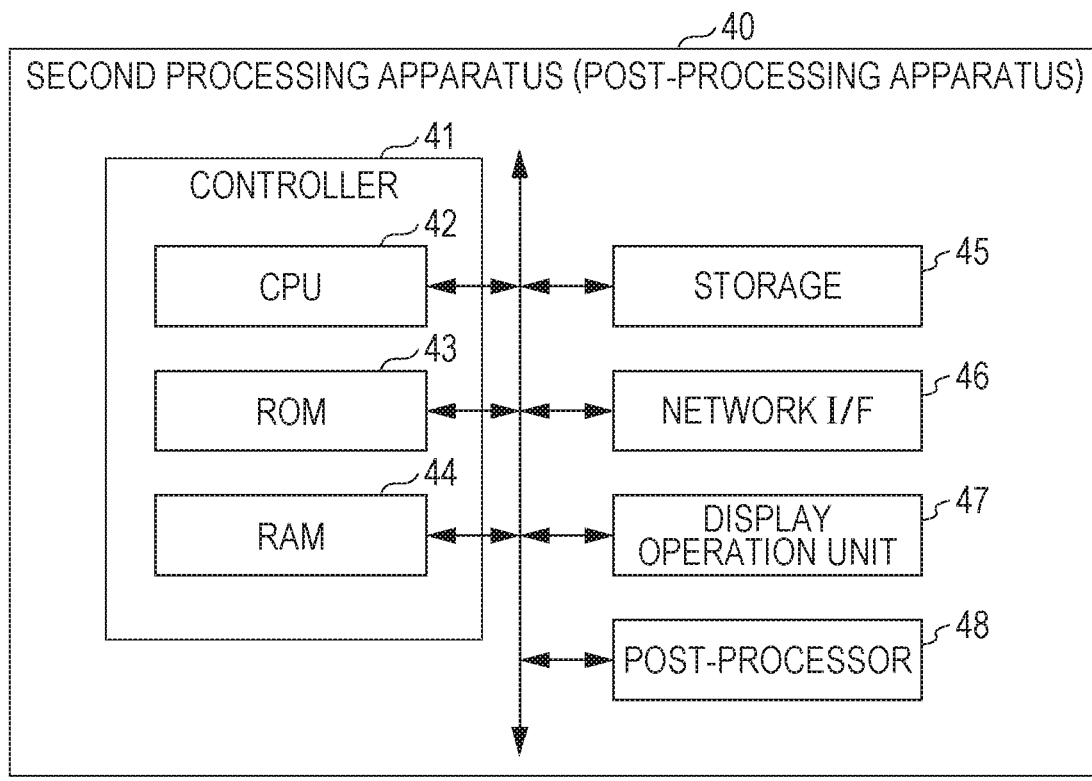
FIGS. 4A and 4B are block diagrams illustrating a configuration of a second processing apparatus according to the embodiment of the present invention.
Figure 4B:
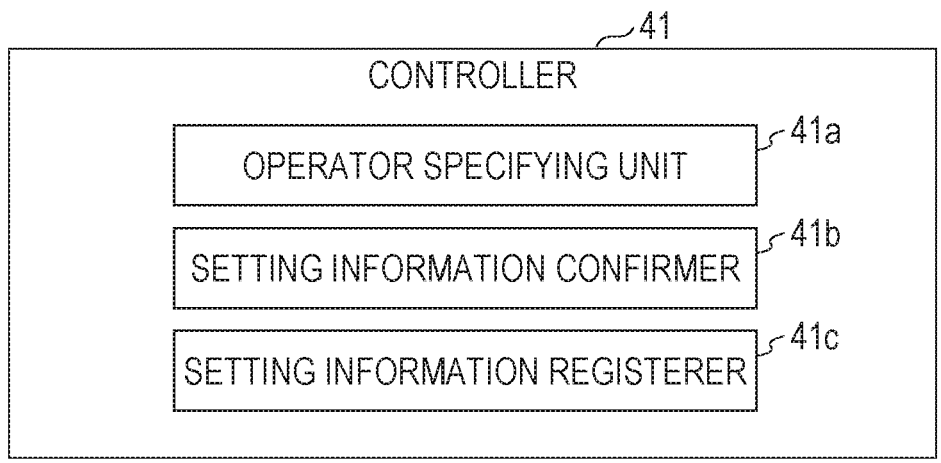
Figure 5:
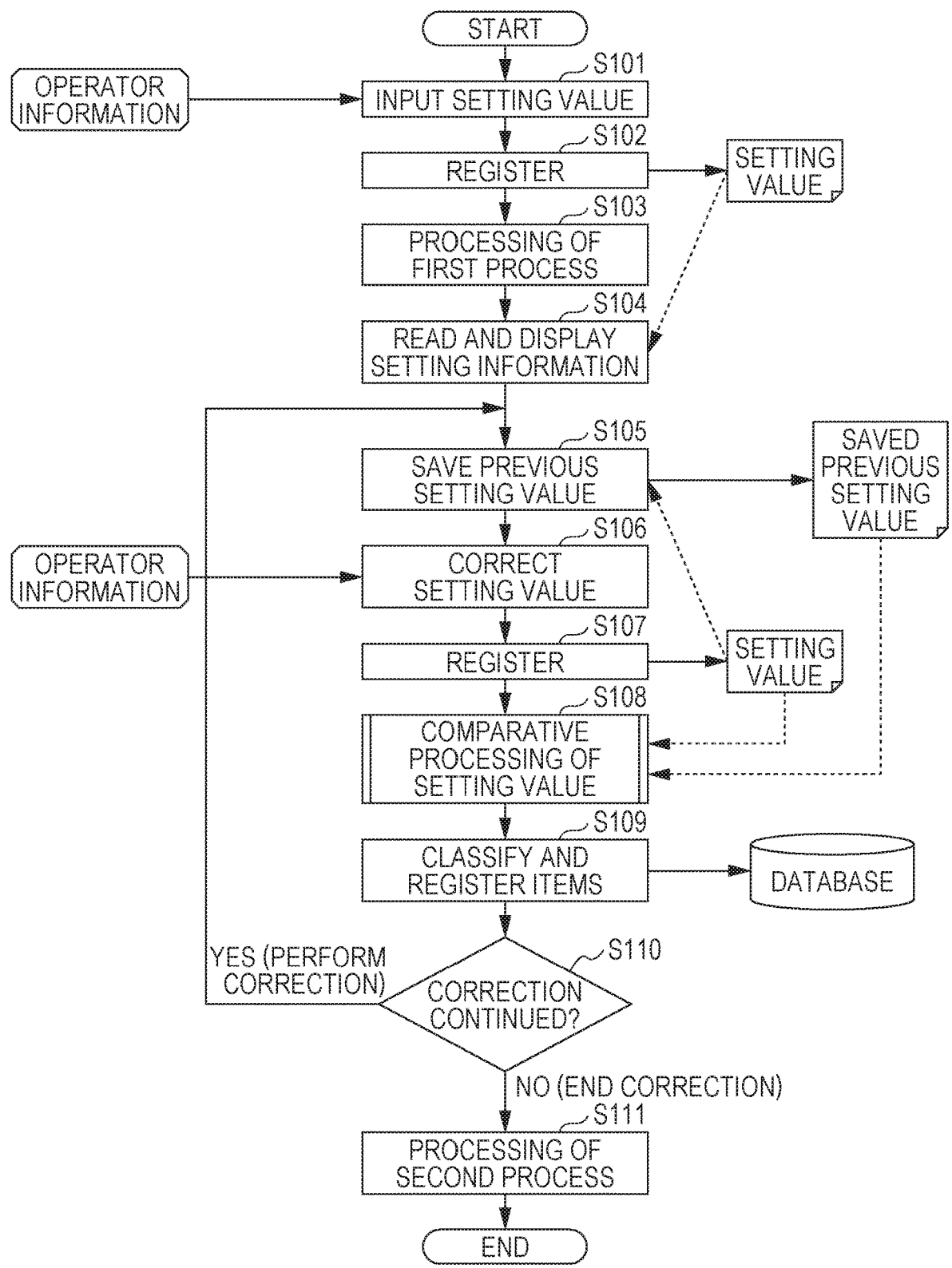
FIG. 5 is a flowchart illustrating the operation (overall processing) of a printing system according to the embodiment of the present invention.
Figure 6:
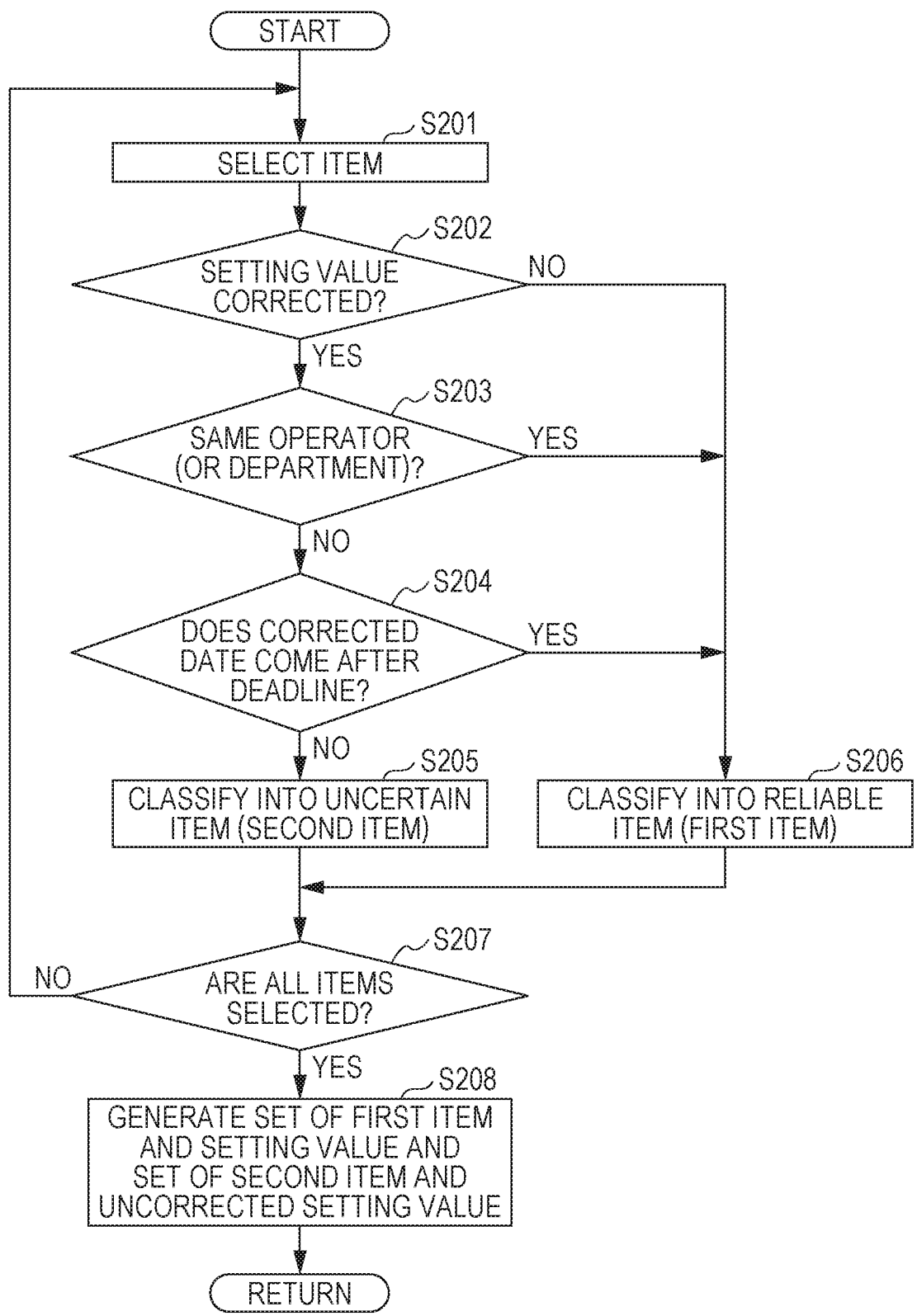
FIG. 6 is a flowchart illustrating the operation (comparative processing of the second processing apparatus) of the printing system according to the embodiment of the present invention.

In order to explain the above-described embodiment of the present invention further in detail, a setting control program and a setting control method according to an embodiment of the present invention will be described with reference to FIGS. 1 to 11. FIGS. 1 and 2 are schematic diagrams illustrating a configuration of a printing system of the present embodiment, FIGS. 3A and 3B are block diagrams illustrating a configuration of a first processing apparatus, and FIGS. 4A and 4B are block diagrams illustrating a configuration of a second processing apparatus. FIGS. 5 and 6 are flowcharts illustrating the operation of the printing system of the present embodiment. FIG. 7 is a diagram illustrating an example of a print setting screen displayed on the first processing apparatus of the present embodiment. FIGS. 8 to 10 are diagrams illustrating examples of a part of items and their setting values of the print setting screen, and FIG. 11 is a diagram illustrating an example of registration information of a database stored in a storage device of the present embodiment. Hereinafter, it is assumed that printing processing includes a pre-process and a post-process, that the first processing apparatus performs setting of a print job to perform the pre-process, and that the second processing apparatus confirms/corrects the setting of the print job to perform the post-process.

As illustrated in FIG. 1, a printing system 10 of the present embodiment includes a storage device 20, a first processing apparatus 30, a second processing apparatus 40, which are connected via a communication network 50 such as a local area network (LAN) or a wide area network (WAN) defined by standards such as Ethernet (registered trademark), Token Ring, and fiber-distributed data interface (FDDI).

Note that, in FIG. 1, the first processing apparatus 30 is an image forming apparatus and the second processing apparatus 40 is a post-processing apparatus; however as illustrated in FIG. 2, the first processing apparatus 30 may be a setting apparatus such as a computer with the second processing apparatus 40 being an apparatus that performs actual processing such as an image forming apparatus. Alternatively, the first processing apparatus 30 and the second processing apparatus 40 may be setting apparatuses such as a computer (for example, the first processing apparatus 30 may be an apparatus to which an operator in the sales department inputs data with the second processing apparatus 40 being an apparatus to which an operator in the design department inputs data).

Furthermore, in the present embodiment it is assumed setting operation of a print job is performed by the first processing apparatus 30 installed at a place where a first process is performed and that editing operation of the print job is performed by the second processing apparatus 40 installed at a place where a second process subsequent to the first process is performed; however, a single processing apparatus may be used to perform setting operation of a print job at a place where the first process is performed and to perform editing operation of the print job at a place where the second process is performed. Hereinafter, each of the apparatuses will be described on the premise of the configuration of FIG. 1.

[Storage Device]

The storage device 20 is a device that stores setting information of print jobs (setting values of each item on the print setting screen) as a database. In the present embodiment, the database is classified into reliable items, whose setting values by the first processing apparatus 30 have not been corrected by the second processing apparatus 40, and uncertain items whose setting values have been corrected. A set of the reliable items and setting values of the items as well as a set of the uncertain items and corrected setting values of the items are distinguishably registered. Note that, as for the uncertain items, setting values before and after the correction may be registered in combination.

[First Processing Apparatus]

The first processing apparatus 30 is an image forming apparatus such as a multi-functional peripheral (MFP) that performs a pre-process (printing process in the present embodiment) out of processes specified by the print job. As illustrated in FIG. 3A, the first processing apparatus 30 includes a controller 31, a storage 35, a network I/F 36, a display operation unit 37, an image processor 38, a print processor 39, and other components.

The controller 31 includes a central processing unit (CPU) 32 and memories such as a read only memory (ROM) 33 and a random access memory (RAM) 34. The CPU 32 controls the operation of the entire first processing apparatus 30 by developing, on the RAM 34, a control program stored in the ROM 33 or the storage 35 and executing the control program.

As illustrated in FIG. 3B, the controller 31 functions as an operator specifying unit 31a, a print job setting adjuster 31b, and other components.

The operator specifying unit 31a specifies an operator operating the first processing apparatus 30 (sets a print job) by comparing user information input by the display operation unit 37 and information registered in advance in the storage 35 or other components. Note that the user information is not limited to information input by the display operation unit 37 but may be information stored in a radio frequency identification (RFID) tag or the like, biometric information such as fingerprint information, voiceprint information, and iris information, or other information.

The print job setting adjuster 31b causes the display operation unit 37 to display a print setting screen, receives setting operation on each item on the print setting screen, generates a print job on the basis of setting values of items, and outputs the generated print job to the storage device 20 or the second processing apparatus 40, thereby registering setting information of the print job. The print job setting adjuster 31b further associates, to the print job, information or a department of the operator who has performed the setting operation on each item of the print job to register.

Note that, in the case of the configuration of FIG. 2, the function of the print job setting adjuster 31b can be implemented by a printer driver or a direct print utility. For example, when a print job in the Page Description Language (PDL) described in a page description language such as the Printer Job Language (PJL), the PostScript (PS), or the Printer Control Language (PCL) is generated, it is possible to allow the printer driver to have the function of the print job setting adjuster 31b and to accept setting operation on the print setting screen displayed by the printer driver. In addition, when a print job that can be directly printed such as the Portable Document Format (PDF), the XML Paper Specification (XPS), the Office Open XML (OOXML), and the OpenDocument Format (ODF) is generated, it is possible to allow the direct print utility to have the function of the print job setting adjuster 31b and to accept setting operation on the print setting screen displayed by the direct print utility.

The storage 35 is configured by a hard disk drive (HDD), a solid state drive (SSD), and the like, and stores a program for the CPU 22 to control each component, information of a processing function of the storage 35, a print job generated by the print job setting adjuster 31b, image data generated by the image processor 38, etc.

The network I/F 36 is configured by a network interface card (NIC), a modem, and the like, connects the first processing apparatus 30 to the communication network 50, and transmits a print job to the storage device 20 or the second processing apparatus 40.

The display operation unit 37 is a touch panel provided with a pressure-sensitive type operation unit (touch sensor) in which transparent electrodes are arranged in a lattice pattern on a display and displays various screens related to printing processing and enables various operations related to printing. In the present embodiment, in particular, the display operation unit 37 displays a print setting screen and enables setting operation of a print job.

The image processor 38 functions as a raster image processor (RIP), translates a job to generate intermediate data, and performs rendering to generate image data in the bitmap format (this series of processing is referred to as RIP processing). In addition, the image processor 38 performs screen processing, gradation correction, density balance adjustment, thinning, halftone processing, and the like on image data as necessary. Then, the image processor 38 outputs the generated image data to the print processor 39.

The print processor 39 executes printing processing on the basis of the image data. The print processor 39 includes: an exposurer that emits laser light on the basis of the image data to perform exposure; an image former which includes a photoreceptor drum, a developer, a charger, a photoreceptor cleaner, and a primary transfer roller and forms toner images of the respective colors of CMYK; an intermediate belt which is rotated by a roller and functions as an intermediate transfer body which conveys the toner images formed by the image former to a paper; a secondary transfer roller which transfers the toner images formed on the intermediate belt onto the paper; a fixer which fixes the toner images transferred onto the paper; and conveyors that convey the paper such as a paper feed roller, a registration roller, a loop roller, a reverse roller, and a paper ejecting roller.

[Second Processing Apparatus]

The second processing apparatus 40 is a post-processing apparatus or other apparatuses that performs a post-process (post-processing process in the present embodiment) out of processes specified in a print job. As illustrated in FIG. 4A, the second processing apparatus 40 includes a controller 41, a storage 45, a network I/F 46, a display operation unit 47, a post-processor 48, and other components.

The controller 41 includes a CPU 42 and memories such as a ROM 43 and a RAM 44. The CPU 42 controls the operation of the entire second processing apparatus 40 by developing, on the RAM 44, a control program stored in the ROM 43 or the storage 45 and executing the control program.

As illustrated in FIG. 4B, the controller 41 functions as an operator specifying unit 41a, a setting information confirmer 41b, a setting information registerer 41c, and other components.

The operator specifying unit 41a specifies an operator operating the second processing apparatus 40 (corrects setting values of a print job) by comparing user information input by the display operation unit 47 and information registered in advance in the storage 45 or other components. Note that the user information is not limited to information input by the display operation unit 47 but may be information stored in an RFID tag or the like, biometric information such as fingerprint information, voiceprint information, and iris information, or other information.

The setting information continuer 41b reads setting information of a print job registered in advance in the storage 45 or the storage device 20 and displays, on the display operation unit 47, a setting value of each item in a correctable manner.

When correcting a setting value of any item, the setting information registerer 41c saves an uncorrected setting value of the item in the storage 45 or other components. Then, the setting information registerer classifies each item of the print job either as a reliable item (not problematic) in which the setting value is not corrected (referred to as a first item) or as an uncertain (problematic) item in which the setting value is corrected (referred to as a second item) and registers, in the database, a set of the first item and the setting value of the first item and a set of the second item and the uncorrected setting value of the second item distinguishably (for example, by setting a flag in the second item). In the case where the print job is registered in association with information of the operator who has performed setting operation of each item of the print job, an item a setting value of which has been corrected is associated with the information of the operator who has performed the correction operation of the item and is thereby registered to allow the item to be classified as the second item when an operator different from the operator, who has performed the setting operation, performs correction operation of the item. Moreover, in the case where the print job is registered in association with a department which has performed setting operation of each item of the print job, an item a setting value of which has been corrected is associated with the department which has performed the correction operation of the item and is thereby registered to allow the item to be classified as the second item when a department different from the department, which has performed the setting operation, performs correction operation of the item. Meanwhile, in the case where an expiration date is set in the print job, even when a setting value of an item is corrected, the item is not classified as the second item in the case where the setting value is corrected after the expiration date. The expiration date may be set as a delivery date that is set in the print job or may be set on the basis of a character string included in the print job.

Note that the operator specifying unit 41a, the setting information confirmer 41b, and the setting information registerer 41c may be implemented by hardware. Alternatively, the controller 41 may be implemented by a setting control program for causing the controller 41 to function as the operator specifying unit 41a, the setting information confirmer 41b, and the setting information registerer 41c (in particular, as the setting information confirmer 41b and the setting information registerer 41c) with the CPU 42 executing the setting control program.

The storage 45 is configured by an HDD, an SSD, or the like, and stores a program for the CPU 42 to control each component, information related to a processing function of the storage 45, a print job acquired from the storage device 20 or received from the first processing apparatus 30, the classification result of the first item and the second item, uncorrected setting values of items having been subjected to correction operation, etc.

The network I/F 46 is configured by an NIC, a modem, or the like, connects the second processing apparatus 40 to the communication network 50, receives a print job from the first processing apparatus 30, acquires a print job from the storage device 20, and transmits setting information to the storage device 20.

The display operation unit 47 is a touch panel provided with a pressure-sensitive type operation unit (touch sensor) in which transparent electrodes are arranged in a lattice pattern on a display and displays various screens related to printing processing and enables various operations related to printing. In the present embodiment, in particular, a setting value of each item of the print job is displayed in a correctable manner to enable correction operation of the setting value.

The post-processor 48 applies post-processing preferred by a user, such as punching, stapling, folding, booklets, or cutting to papers printed out by the first processing apparatus (image forming apparatus) 30 and thereby outputs the papers.

Note that FIGS. 1 to 4A and 4B are examples of the printing system 10 of the present embodiment; and thus the configuration or control of each of the apparatuses can be modified as appropriate as long as the setting control of the present embodiment can be implemented. For example, in FIGS. 1 and 2, the first processing apparatus 30, the second processing apparatus 40, and the storage device 20 are separate apparatuses; however in the case where the storage device 20 is included in the first processing apparatus 30 or the second processing apparatus 40 (the database is stored in the storage 35 of the first processing apparatus 30 or the storage 45 of the second processing apparatus 40), the storage device 20 maybe omitted. In the present embodiment, the first processing apparatus 30 is the image forming apparatus and the second processing apparatus 40 is the post-processing apparatus; however, it is only required that the first processing apparatus 30 perform a pre-process and that the second processing apparatus 40 perform a post-processing that is subsequent to the pre-process, and the contents of the pre-process and the post-process can be set in a desired manner.

Hereinafter, the operation of the printing system 10 of the present embodiment will be specifically described. The CPU 42 of the second processing apparatus 40 develops, on the RAM 44, the setting control program stored in the ROM 43 or the storage 45 and executes the setting control program to execute processing of S104 and the subsequent steps illustrated in the flowchart of FIG. 5 and processing of each step illustrated in the flowchart of FIG. 6.

First, the controller 31 (operator specifying unit 31a) of the first processing apparatus 30 specifies an operator who operates the first processing apparatus 30 as required. Then, the controller 31 (print job setting adjuster 31b) displays a print setting screen 60 as illustrated in FIG. 7, for example, on the display operation unit 37 to accept input of a setting value (S101) and, for each item, registers the input setting value in the storage device 20 and transmits the setting value to the second processing apparatus 40 (S102). At that time, as required, operator information is associated with the input setting value. Thereafter, in the case where the first processing apparatus 30 performs actual processing, processing of a first process (for example, generation processing of image data by the image processor 38 and image forming processing on a paper by the print processor 39) is executed in accordance with the settings of the print setting screen 60 (S103).

Next, the controller 41 (operator specifying unit 41a) of the second processing apparatus 40 specifies an operator who operates the second processing apparatus 40 as required. Next, the controller 41 (setting information confirmer 41b) reads setting information of a print job registered in advance in the storage 45 or the storage device 20 and displays, on the display operation unit 47, a setting value of each item in a correctable manner (S104). Then, the controller 41 (setting information confirmer 41b) saves, in the storage 45 or other components, a setting value (previous setting value) that has been saved immediately before acceptance of correction of the setting value (S105), and when the setting value is corrected (S106), registers the corrected setting value in the storage 45 or other components (S107). At that time, as required, operator information is associated with the saved previous setting value and the corrected setting value.

Next, the controller 41 (setting information registerer 41c) performs processing of comparing the previous setting value saved in S105 with a corrected setting value registered in S107 (S108).

FIG. 6 illustrates the details of this step. First, one item is selected (S201), and then it is determined whether the setting value has been corrected (S202). When the setting value has been corrected, as required, it is determined whether the operator who has performed the setting operation and the operator who has performed the correction operation are the same (or the department that has performed the setting operation and the department that has performed the correction operation are the same) (S203). In the case where the two operators are different (or the two departments are different), it is determined whether the correction date of the setting value is after a preset expiration date as necessary (S204).

If the setting value is not corrected (No in S202), if the two operators are the same (or the two departments are the same) (Yes in S203), or if the correction date of the setting value is after the expiration date (Yes in S204), the item is classified as the reliable item (first item) (S206). On the other hand, if the setting value is corrected (Yes in S202), if the two operators (or departments) are different (No in S203), or if the correction date of the setting value is before the expiration date (No in S204), the item is classified as the uncertain item (second item) (S205). Thereafter, it is determined whether all the items have been selected (S207). If there is any item not selected (No in S207), the flow returns to S201 to repeat similar processing for the next item. If all the items have been selected (Yes in S207), a set of the first item and a setting value of the first item and a set of the second item and an uncorrected setting value of the second item are generated (S208).

Returning back to FIG. 5, after comparing the setting values, the controller 41 (setting information registerer 41c) registers the set of the first item and the setting value of the first item and the set of the second item and the uncorrected setting value of the second item in the storage device 20 so as to be usable as a database (S109). At that time, it is preferable to allow the second item to be distinguishable for example by applying a flag to the set of the second item and the uncorrected setting value of the second item. Thereafter, the controller 41 determines whether to continue the correction (S110). If the correction is to be continued (Yes in S110), the flow returns to S105 and repeats similar processing to repeatedly execute this processing until setting of each step is completed. If the correction is to be terminated (No in S110), the second process (for example, post-processing by the post-processor 48) is executed according to the corrected setting value (S111).

Hereinafter, specific examples will be described.

FIG. 7 illustrates an example of the print setting screen 60 displayed on the display operation unit 37 of the first processing apparatus 30. On the print setting screen 60, items related to both the pre-process and the post-process are displayed, and a setting value is input to each of the items. FIG. 8 is a diagram illustrating a part of the items to be set on the print setting screen 60. In this example, setting values are input for respective items such as the printing method, the print size, the paper size, the bookbinding method, and the delivery date. In the case where these pieces of setting information have been provisionally input by a sales representative (operator A), for example as illustrated in FIG. 9, the attribute of the operator is associated to each of the items and thereby registered.

Let us assume that, in a design department of a next step (post-process), an operator B of the print job finds out a problem with respect to the print size and the paper size and corrects the paper size from A4 to A3 as illustrated in FIG. 10. In this case, as for the item of "paper size," since the setting values are different and the operators are different, a set of the item and the setting value of "paper size: A4" before the correction registered in the database as uncertain setting contents, and sets of the other uncorrected items and setting values thereof are registered in the database as reliable setting contents as illustrated in FIG. 11. At this time, registration of items with high individuality such as the delivery date can be omitted.

These uncertain setting content and reliable setting contents are separately checked by a technician or processes using statistical processing, machine learning, or the like, which allows a new prohibition item to be discriminated in settings. In this case, a prohibition can be newly set that "paper size: A4" is unfavorable under the conditions of "printing method: DEP," "print size: A4," and "bookbinding method: saddle stitching."

In this manner, when the setting is modified in the post-process for an item that has been set in the pre-process, by determining that a setting value of the item is uncertain and automatically configuring the database while allowing the item to be distinguishable, the input load of the operator can be reduced, and the relationship between the reliable item having no problematic setting value and the uncertain item having a problematic setting value before correction can be automatically learned. In addition, it is possible to call attention for uncertain items at the time of setting and to prevent inappropriate setting in advance.

Note that the present invention is not limited to the above-described embodiments, and the configuration or control of the printing system can be modified as appropriate without departing from the gist of the present invention.

For example, in the above embodiment, the case where the first processing apparatus 30 is the image forming apparatus and the second processing apparatus 40 is the post-processing apparatus has been described; however, the first processing apparatus 30 may be a setting device such as a computer with the second processing apparatus 40 being an apparatus that performs actual processing such as an image forming apparatus. Alternatively, the setting control method of the present invention can be similarly applied to a case where the first processing apparatus 30 and the second processing apparatus 40 are setting devices such as a computer.

In the above embodiments, the setting items are exemplified by the printing method, the print size, the paper size, the bookbinding method, and the delivery date; however, the setting items may be any desired items and can be modified as appropriate. In the above embodiments, the system that performs the printing processing has been described. However, the setting control method of the present invention may be similarly applied to any system in which one device performs setting operation and another device performs correction operation.

The present invention can be used for a setting control program for controlling registration of setting information of a print job, a recording medium recording the setting control program, and a setting control method.

Although embodiments of the present invention have been described and illustrated in detail, the disclosed embodiments are made for purposes of illustration and example only and not limitation. The scope of the present invention should be interpreted by terms of the appended claims.

What is claimed is:

1. A non-transitory recording medium storing a computer readable program executable by a computer of an apparatus that corrects a print job in a printing system on a communication network, the program being executable by the computer to control the apparatus to perform operations comprising:
    reading previously-registered setting information of the print job, the setting information comprising a plurality of items indicating aspects of the print job and respective setting values of the plurality of items, and the setting information having been obtained via the communication network from an external apparatus;
    displaying the setting information, including the items and the setting values thereof, on a display of the apparatus;
    accepting a correction of the setting value of at least one of the items, by a user of the apparatus;
    in response to a correction of one of the setting values of one of the items by the user, registering a corrected value of the setting value in a storage of the apparatus, and saving a pre-correction value of the setting value in the storage;
    classifying, in the setting information obtained via the network from the external apparatus, each set of one of the items and the setting value thereof as either a first type or a second type, based on whether or not the setting value of the item has been corrected by the user of the apparatus, wherein the first type corresponds to a set of an item and setting value that is considered to be reliable in the setting information, and the second type corresponds to a set of an item and setting value that is not considered to be reliable in the setting information; and
    registering, in a database in a distinguishable manner, each set that has been classified as the first type and each set that has been classified as the second type from the setting information, wherein each set that has been classified as the second type includes the item and the stored pre-correction value of the setting value of the item.

2. The non-transitory recording medium according to claim 1, wherein:
    the print job is registered in association with information of an operator who performed a setting operation of the respective setting values of the plurality of items,
    in response to the correction of one of the setting values of one of the items by the user, the corrected value of the setting value of the one of the items is registered in the storage of the apparatus in association with information of of the user who performed the correction, and
    the classifying includes determining whether the user who performed the correction is the same as the operator who performed the setting operation, and classifying a set of the one of the items and the setting value thereof as the second type when it is determined that the user who performed the correction is not the same as the operator who performed the setting operation.

3. The non-transitory recording medium according to claim 1, wherein:
    the print job is registered in association with information of a department that performed a setting operation of the respective setting values of the plurality of items,
    in response to the correction of one of the setting values of one of the items by the user, the corrected value of the setting value of the one of the items is registered in the storage of the apparatus in association with a department of the user who performed the correction, and
    the classifying includes determining whether the department of the user who performed the correction is the same as the department that performed the setting operation, and classifying a set of the one of the items and the setting value thereof as the second type when it is determined that the department of the user who performed the correction is not the same as the department that performed the setting operation.

4. The non-transitory recording medium according to claim 1, wherein:
    an expiration date is set based on information in the print job, and
    in the classifying, a set of one of the items and the setting value thereof is not classified as the second type, even if the setting value of the item has been corrected by the user of the apparatus, in a case where the setting value is corrected after the expiration date.

5. The non-transitory recording medium according to claim 4, wherein a delivery date set in the print job is set as the expiration date.

6. The non-transitory recording medium according to claim 4, wherein the expiration date is set based on a character string included in the print job.

7. The non-transitory recording medium according to claim 1, wherein the print job instructs processing for a first process and a second process that is subsequent to the first process, and the apparatus is an apparatus that performs the second process.

8. A setting control method in a system comprising a first apparatus that performs setting of a print job and a second apparatus that corrects the print job in a printing system on a communication network, the method comprising:
   by the first apparatus:
      accepting a setting operation of the print job; and
      registering setting information of the print job, the setting information comprising a plurality of items indicating aspects of the print job and respective setting values of the plurality of items; and
   by the second apparatus:
      obtaining, via the communication network, the setting information registered by the first apparatus;
      displaying the setting information, including the items and the setting values thereof, on a display of the second apparatus;
      accepting a correction of the setting value of at least one of the items, by a user of the second apparatus;
      in response to a correction of one of the setting values of one of the items by the user, registering a corrected value of the setting value in a storage of the second apparatus, and saving a pre-correction value of the setting value in the storage;
      classifying, in the setting information obtained via the network from the first apparatus, each set of one of the items and the setting value thereof as either a first type or a second type, based on whether or not the setting value of the item has been corrected by the user of the second apparatus, wherein the first type corresponds to a set of an item and setting value that is considered to be reliable in the setting information, and the second type corresponds to a set of an item and setting value that is not considered to be reliable in the setting information;
      registering, in a database in a distinguishable manner, each set that has been classified as the first type and each set that has been classified as the second type from the setting information, wherein each set that has been classified as the second type includes the item and the stored pre-correction value of the setting value of the item.

9. The setting control method according to claim 8, further comprising:
   by the first apparatus:
      registering the print job in association with information of an operator who performed the setting operation of the print job; and
   by the second apparatus:
      in response to the correction of one of the setting values of one of the items by the user, registering the corrected value of the setting value of the one of the items in the storage of the second apparatus in association with information of the user who performed the correction;
      wherein the classifying includes determining whether the user who performed the correction is the same as the operator who performed the setting operation, and classifying a set of the one of the items and the setting value thereof as the second type when it is determined that the user who performed the correction is not the same as the operator who performed the setting operation.

10. The setting control method according to claim 8, further comprising:
   by the first apparatus:
      registering the print job in association with a department that performed the setting operation of each of the print job; and
   by the second apparatus:
      in response to the correction of one of the setting values of one of the items by the user, registering the corrected value of the setting value of the one of the items in the storage of the second apparatus in association with a department of the user who performed the correction,
      wherein the classifying includes determining whether the department of the user who performed the correction is the same as the department that performed the setting operation, and classifying a set of the one of the items and the setting value thereof as the second type when it is determined that the department of the user who performed the correction is not the same as the department that performed the setting operation.

11. The setting control method according to claim 8, wherein:
   an expiration date is set based on information in the print job, and
   in the classifying, a set of one of the items and the setting value thereof is not classified as the second type, even if the setting value of the item has been corrected by the user of the second apparatus, in a case where the setting value is corrected after the expiration date.

12. The setting control method according to claim 11, wherein the second apparatus sets a delivery date set in the print job as the expiration date.

13. The setting control method according to claim 11, wherein the second apparatus sets the expiration date based on a character string included in the print job.

14. The setting control method according to claim 8, wherein the print job instructs processing for a first process and a second process that is subsequent to the first process, the first apparatus performs the first process, and the second apparatus performs the second process.

* * * * *